US011880565B2

(12) United States Patent
Slassi et al.

(10) Patent No.: US 11,880,565 B2
(45) Date of Patent: *Jan. 23, 2024

(54) TOUCH SCREEN DISPLAY WITH VIRTUAL TRACKPAD

(71) Applicant: Microsoft Technology Licensing, LLC, Redmond, WA (US)

(72) Inventors: Matan Slassi, Tel Aviv (IL); Dmitry Birenberg, Rosh Ha Ayin (IL); Gilad Pundak, Rehovot (IL); Nadav Linenberg, Even Yehuda (IL); Andrew Pyon Mittereder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,225

(22) Filed: Nov. 22, 2022

(65) Prior Publication Data

US 2023/0079491 A1   Mar. 16, 2023

Related U.S. Application Data

(63) Continuation of application No. 17/080,648, filed on Oct. 26, 2020, now Pat. No. 11,543,961.

(51) Int. Cl.
*G06F 3/04886* (2022.01)
*G06F 3/041* (2006.01)

(52) U.S. Cl.
CPC ........ *G06F 3/04886* (2013.01); *G06F 3/0412* (2013.01); *G06F 3/0416* (2013.01); *G06F 2203/04803* (2013.01)

(58) Field of Classification Search
CPC ............. G06F 3/041661; G06F 3/0416; G06F 3/0412; G06F 3/04886; G06F 3/04883; G06F 2203/04803
See application file for complete search history.

(56) References Cited

U.S. PATENT DOCUMENTS

2015/0153951 A1\* 6/2015 Kim ...................... G06F 3/0488
715/773
2020/0348807 A1\* 11/2020 Garcia ................ G06F 3/04883

\* cited by examiner

*Primary Examiner* — Yaron Cohen

(74) *Attorney, Agent, or Firm* — Alleman Hall Creasman & Tuttle LLP

(57) ABSTRACT

Examples are disclosed relating to computing devices and methods for performing touch detection within a virtual trackpad area of a touch screen display. In one example, a non-trackpad touch input signal is received from outside the virtual trackpad area and processed with at least one touch detection algorithm applying a non-trackpad threshold value. A virtual trackpad touch input signal is determined to be received from within the virtual trackpad area. On condition of determining that the virtual trackpad touch input signal is received from within the virtual trackpad area, the virtual trackpad touch input signal is processed with the touch detection algorithm applying a virtual trackpad threshold value different from the non-trackpad threshold value.

20 Claims, 8 Drawing Sheets

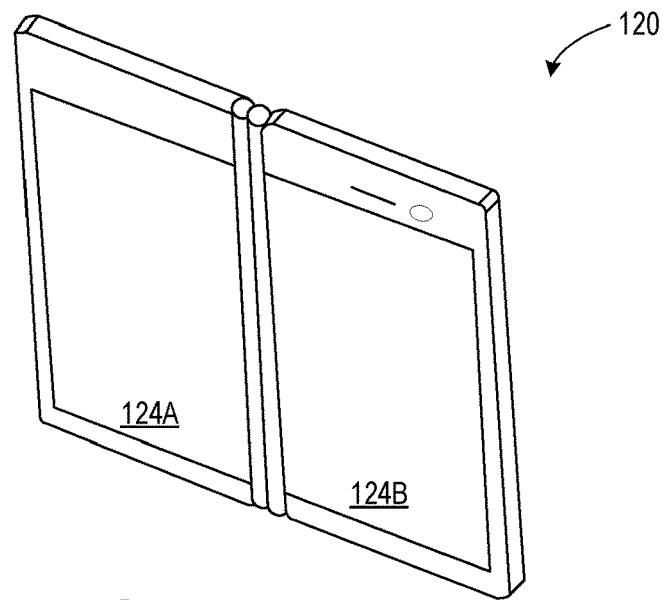
FIG. 2
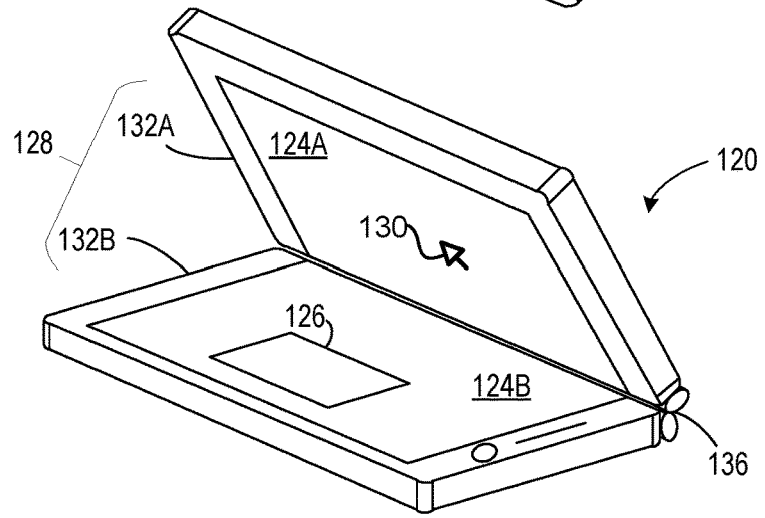
FIG. 3
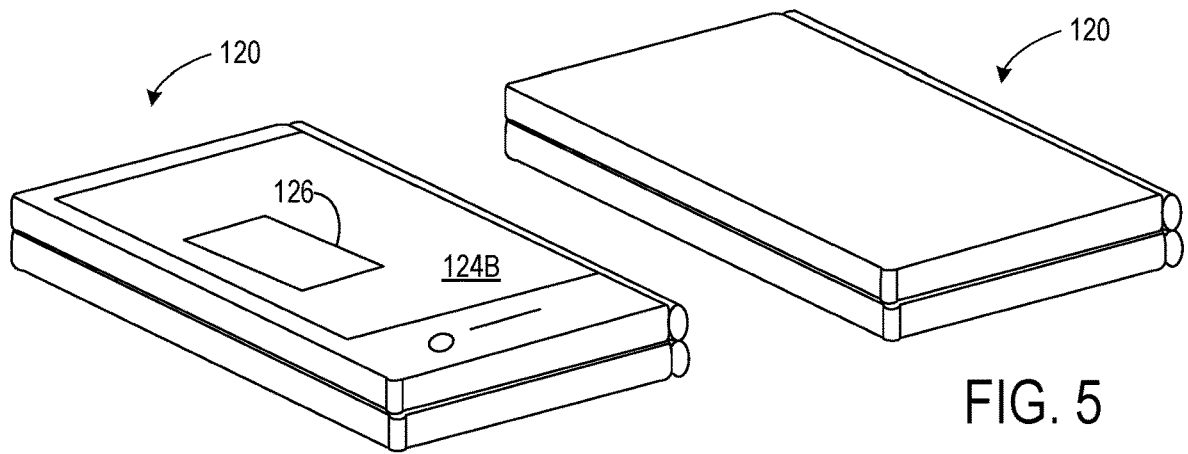
FIG. 4
FIG. 5

(B) → 300

```
WHEREIN THE AT LEAST ONE TOUCH DETECTION ALGORITHM
COMPRISES PALM DETECTION ALGORITHM, THE NON-TRACKPAD
THRESHOLD VALUE IS A NON-TRACKPAD PALM DESIGNATION
THRESHOLD, AND THE VIRTUAL TRACKPAD THRESHOLD VALUE
IS A VIRTUAL TRACKPAD PALM DESIGNATION THRESHOLD THAT
REDUCES BIASING TOWARDS CLASSIFYING THE VIRTUAL
TRACKPAD TOUCH INPUT SIGNAL AS A USER'S PALM AS
COMPARED TO THE NON-TRACKPAD PALM DESIGNATION
THRESHOLD 332
```

↓

```
WHEREIN THE AT LEAST ONE TOUCH DETECTION ALGORITHM
COMPRISES JITTER RESTRICTOR ALGORITHM, THE NON-
TRACKPAD THRESHOLD VALUE IS A NON-TRACKPAD DISTANCE
BETWEEN CONSECUTIVE REPORTED TOUCH LOCATIONS, AND
THE VIRTUAL TRACKPAD THRESHOLD VALUE IS A VIRTUAL
TRACKPAD DISTANCE BETWEEN CONSECUTIVE REPORTED
TOUCH LOCATIONS THAT IS SMALLER THAN THE NON-TRACKPAD
TIME PERIOD 336
```

↓

```
DETERMINE THAT NOISE LEVEL IS GREATER THAN NOISE LEVEL
THRESHOLD 340
```

↓

```
ON CONDITION OF DETERMINING THAT NOISE LEVEL IS
GREATER THAN NOISE LEVEL THRESHOLD, PROCESS VIRTUAL
TRACKPAD TOUCH INPUT SIGNAL WITH THE JITTER RESTRICTOR
ALGORITHM APPLYING THE NON-TRACKPAD DISTANCE
BETWEEN CONSECUTIVE REPORTED TOUCH LOCATIONS 344
```

↓

```
AFTER DETERMINING THAT NOISE LEVEL IS GREATER THAN
NOISE LEVEL THRESHOLD, PROCESS VIRTUAL TRACKPAD
TOUCH INPUT SIGNAL WITH AT LEAST ONE OF TAP DETECTION
ALGORITHM APPLYING A VIRTUAL TRACKPAD TIME PERIOD AND
A PALM DETECTION ALGORITHM APPLYING A VIRTUAL
TRACKPAD PALM DESIGNATION THRESHOLD THAT REDUCES
BIASING TOWARDS CLASSIFYING THE VIRTUAL TRACKPAD
TOUCH INPUT SIGNAL AS A USER'S PALM AS COMPARED TO THE
NON-TRACKPAD PALM DESIGNATION THRESHOLD 348
```

TOUCH SCREEN DISPLAY WITH VIRTUAL TRACKPAD

CROSS REFERENCE TO RELATED APPLICATIONS

This application is a continuation of U.S. patent application Ser. No. 17/080,648, filed Oct. 26, 2020, the entirety of which is hereby incorporated herein by reference for all purposes.

BACKGROUND

In some computing devices that include one or more touch screen displays, a virtual trackpad is displayed for receiving input from a user's fingers. Processing touch inputs received within the virtual trackpad and touch inputs received outside the virtual trackpad in the same manner can create less than satisfactory user experiences with the virtual trackpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for performing touch detection within a virtual trackpad area of a touch screen display in a manner that more closely replicates a physical trackpad user experience. In one example, a method is disclosed for performing touch detection within a virtual trackpad area of a touch screen display that includes receiving a non-trackpad touch input signal from outside the virtual trackpad area, and processing the non-trackpad touch input signal with at least one touch detection algorithm that applies a non-trackpad threshold value. A virtual trackpad touch input signal is received, and the method determines that the virtual trackpad touch input signal is received from within the virtual trackpad area of the display. On condition of determining that the virtual trackpad touch input signal is received from within the virtual trackpad area, the virtual trackpad touch input signal is processed with the touch detection algorithm applying a virtual trackpad threshold value that is different from the non-trackpad threshold value.

BRIEF DESCRIPTION OF THE DRAWINGS

FIGS. 2-5 show different views of a dual screen mobile computing device that performs touch detection within a virtual trackpad area according to examples of the present disclosure.

FIGS. 8A-8C show a flow diagram of a method for performing touch detection within a virtual trackpad area according to examples of the present disclosure.

DETAILED DESCRIPTION

A variety of different computing devices having various form factors and configurations can utilize touch screen displays. As noted above, in some examples a virtual trackpad is displayed to receive user input from a user's fingers. Touch detections from within the virtual trackpad are used to translate the position and movement of the user's finger(s) to a relative position on the screen of the device. Virtual trackpads can enable user interface features such as selecting a displayed item, scrolling a page, enlarging/shrinking a displayed item, etc. For example, the detection of two adjacent fingers moving within the virtual trackpad can trigger scrolling of a displayed page.

Figure 1:
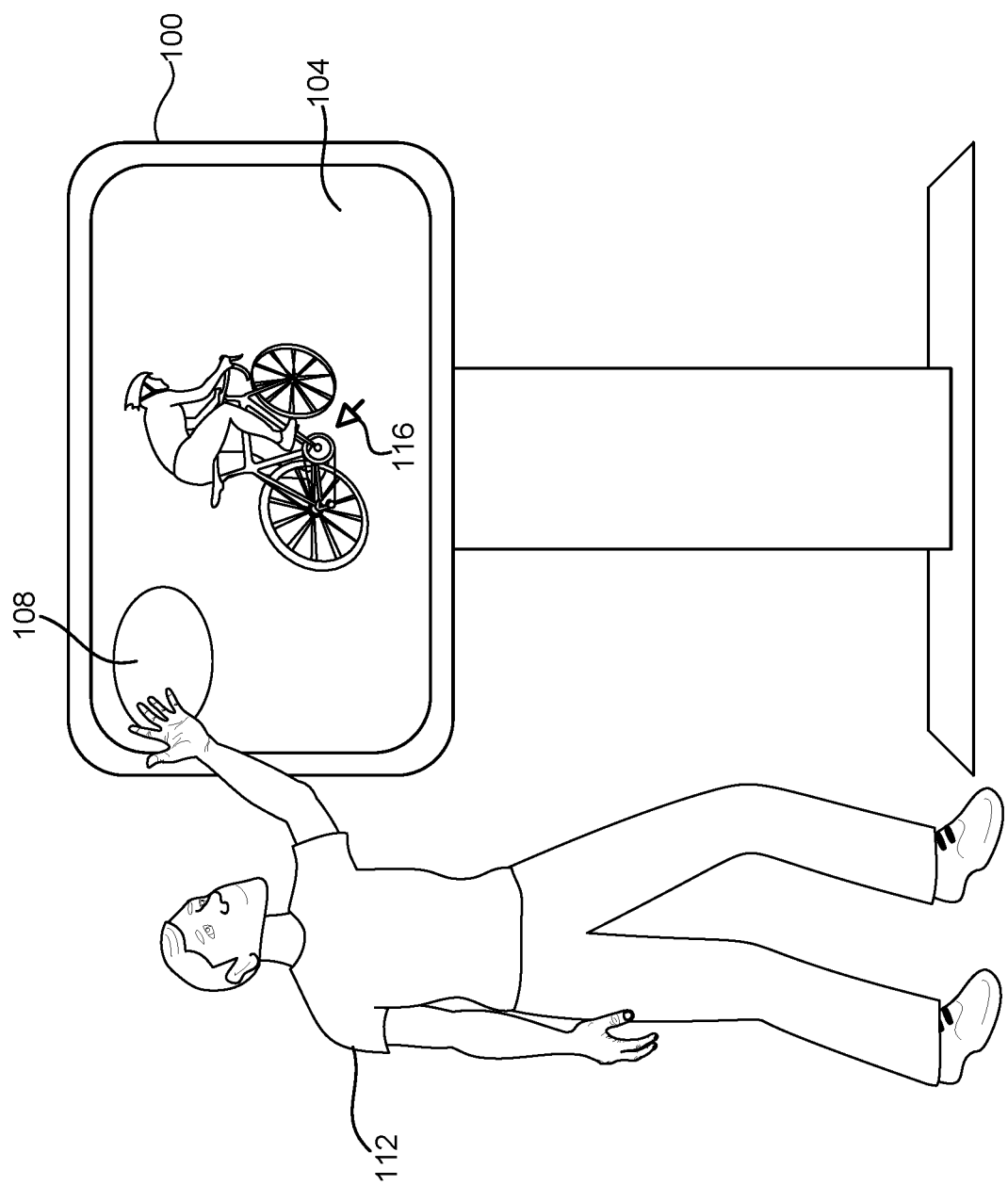
FIG. 1 show one example of a large format display that performs touch detection within a virtual trackpad area according to examples of the present disclosure.

With reference to FIG. 1, in some examples a large format display 100 utilizes a touch screen display 104. As described in more detail below, in this example a virtual trackpad area 108 is displayed on the touch screen display 104 in the form of an oval. In other examples, other shapes and manners of indicating the location of the virtual trackpad area may be utilized, such as visually highlighting the area via different colors. A user 112 may touch the display 100 within the virtual trackpad area 108 to provide user input and control user interface features, such as moving a cursor 116 on the display.

In another example and with reference to FIGS. 2-5, a dual screen mobile computing device 120 include a first touch screen display 124A that is rotatably coupled to a second touch screen display 124B. In some examples, both touch screen displays 124A, 124B can function together as a larger, combined touch screen display system. In one example of this configuration and with reference to FIG. 3, a virtual trackpad area 126 is displayed on the second touch screen display 124B in the form of a rectangular area that may be used, for example, to control cursor 130 displayed on the first touch screen display 124A.

In the example of FIGS. 2-5, the mobile computing device 120 includes a housing 128 having a first part 132A and a second part 132B coupled by a hinge 136. The first part 132A includes first touch screen display 124A and the second part 132B includes second touch screen display 124B. The hinge 136 is configured to permit the first touch screen display 124A and the second touch screen display 124B to rotate 360 degrees between angular orientations from a face-to-face orientation (FIG. 5) to a back-to-back orientation (FIG. 4). In other examples, the first touch screen display 124A and the second touch screen display 124B are not capable of rotating a full 360 degrees.

In some examples, a touch screen display of the present disclosure is a mutual capacitance touch screen display. In these examples, touch inputs are identified by sampling capacitance between a driving electrode and a sensing electrode. Driving electrodes are arranged in an array within the touch screen display. Signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based on determining which driving electrodes were being driven when the touch input occurred, and the frequency of the signal driving each driving electrode. Detecting this current also includes detecting the current flow into various sensing electrodes that results from the increased capacitive coupling between the driving electrodes and the sensing electrodes caused by the finger or other conductive object providing the touch input. In other examples, the principles of the present disclosure may be utilized with touch screen displays employing other touch detection technologies, such as resistive touch detection, projected capacitance touch detection, etc.

As used herein, "touch input" refers to any input detected by a touch-sensitive display device caused by proximity or contact of an input object with the surface of the touch-sensitive display. Non-limiting examples of suitable input objects include human fingers, other portions of a human hand, styli (including active and passive styli), and suitable control devices (e.g., a dial control that affixes to the surface of the display).

As noted above, processing touch inputs received within a virtual trackpad in the same manner as touch inputs received outside the virtual trackpad can create sub-optimal user experiences. More particularly, physical trackpads are configured to provide a level of accuracy and resolution to accurately detect the position and movement of a user's finger(s), and translate such position/movement to a relative position on the screen of the device. This level of accuracy and resolution enables a physical trackpad to provide pleasing user experiences, such as precisely pointing a cursor, selecting a displayed item, detecting movement of two separate fingers to scroll a page, enlarging/shrinking a displayed item, etc.

In many touch screen displays, touch processing algorithms are configured to determine the location on the screen that is selected by the touch input, and to balance a variety of user interaction scenarios and environmental considerations to optimize recognition of user finger and/or stylus interactions across the entire touch screen. With these touch screen displays, a user's experience interacting with a displayed virtual trackpad can fall short of her comparable experience with a physical trackpad. For example and as described in more detail below, applying jitter compensation algorithms in the touch screen display to signals from the virtual trackpad area can result in detection resolutions that do not provide a physical trackpad user experience. In other examples, palm detection algorithms and related heuristics used in the touch screen display can decrease the recognition of multi-finger inputs and other gestures within a virtual trackpad area. Additionally, shorter minimal tap lengths for touch detections in the touch screen display can result in unintended selections within a virtual trackpad area.

Accordingly, examples are disclosed that relate to computing devices and methods for performing touch detection within a virtual trackpad area of a touch screen display in a manner that provides a virtual trackpad user experience that is similar to a user's experience with a physical trackpad. In various examples and as described in more detail below, different threshold values are utilized with touch detection algorithms for processing touch signals depending upon whether the touch signals are received from within or outside a virtual trackpad area of a touch screen display. In some examples, faster touch sensor report rates are employed for trackpad touch input signal received from within the virtual trackpad area. In other examples, a higher virtual trackpad excitation voltage is provided to the electrodes of a touch screen display that are within the virtual trackpad area. Accordingly, and as described in more detail below, these configurations enable the user's experience with a virtual trackpad to closely approximate her experience using a physical trackpad.

Figure 6:
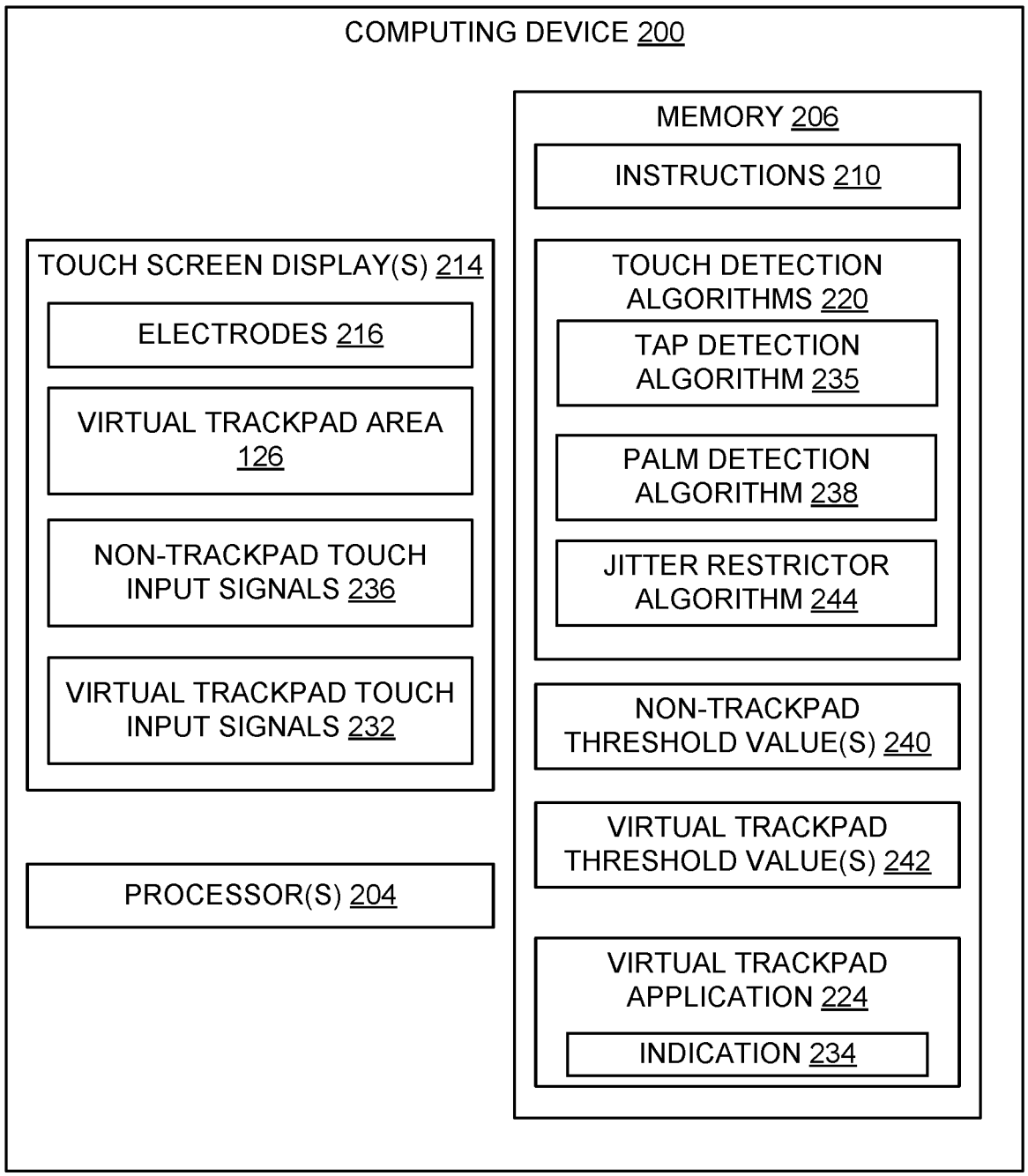
FIG. 6 shows a schematic view of a computing device for performing touch detection within a virtual trackpad area according to examples of the present disclosure.

With reference now to the schematic diagram of FIG. 6, one example of a computing device 200 that performs touch detection within a virtual trackpad area of a touch screen display is illustrated. The computing device 200 may take the form of the large format display 100 of FIG. 1, the dual screen display 120 of FIGS. 2-5, a laptop computing device, tablet computing device, or any other suitable computing device.

As illustrated by example in FIG. 6, the computing device 200 includes one or more processors 204 and memory 206 storing instructions 210 executable by the processor(s). The computing device 200 further includes one or more touch screen displays 214 that utilize a suitable capacitive touch sensor—e.g., relying on mutual capacitance or self-capacitance—although non-capacitive technologies may alternatively be used. In one example, a plurality of electrodes 216 comprising driving and sensing electrodes are arranged in an array within the touch screen display(s) 214. Signals from the electrodes 216 are processed by the processor(s) 204 utilizing touch detection algorithms 220 to detect the proximity of input objects to the touch-sensitive display. For example, the processor(s) 204 may detect changes in capacitance in electrodes 216 caused by proximity of an input object to the display surface. By monitoring electrical conditions at the plurality of display electrodes, the processor(s) 204 may determine the two-dimensional position of the touch input relative to the surface of the touch screen display 214.

As described in more detail below, a virtual trackpad application 224 causes display of a virtual trackpad area 126 on a touch screen display 214. Virtual trackpad touch input signals 232 from electrodes 216 within the virtual trackpad area 126 are received and processed differently from non-trackpad touch input signals 236 received from outside the virtual trackpad area to provide a physical trackpad user experience. In some examples, the two-dimensional position of a touch input relative to the virtual trackpad area 126 is determined by comparing the location of the touch input to the location of the virtual trackpad area. In other examples, an indication 234 received from the virtual trackpad application 224 is used to determine that virtual trackpad touch input signals 232 corresponding to a touch input originated from within the virtual trackpad area 126.

Figure 7:
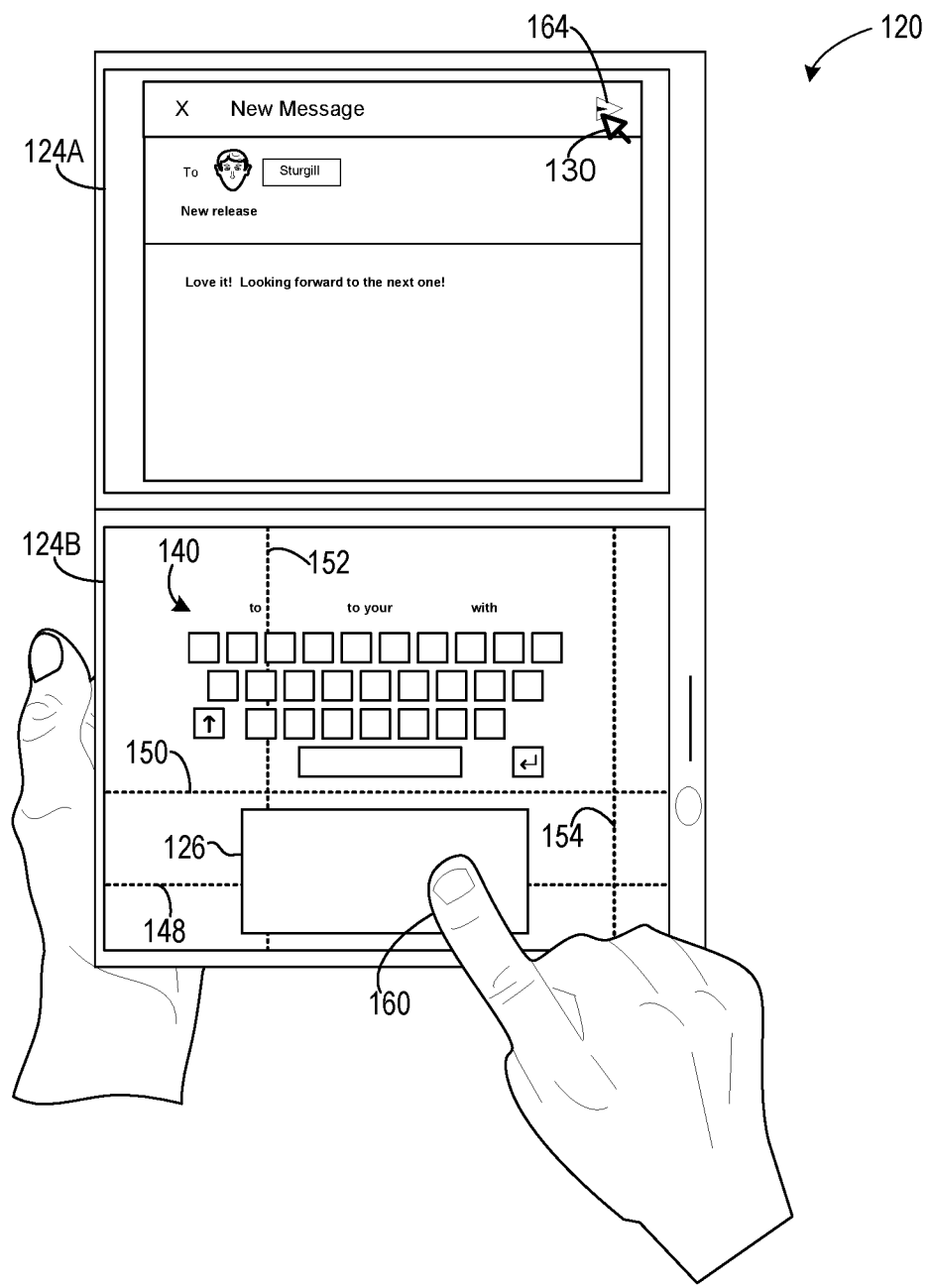
FIG. 7 shows an example use case of the dual screen mobile computing device of FIG. 2-5 according to examples of the present disclosure.

Use case examples of processing trackpad touch input signals from a virtual trackpad area in accordance with the present disclosure are discussed below. With reference now to FIG. 7, one example of computing device 200 in the form of dual screen mobile computing device 120 is provided. In this example, second touch screen display 124B is displaying a virtual trackpad area 126 in the form of a rectangle. Second touch screen display 124B is also displaying a virtual keyboard 140 above the virtual trackpad area 126. The first touch screen display 124A is displaying a screen for composing an email from an email application.

In the second touch screen display 124B, a portion of driving electrodes such as electrode 148 pass within the virtual trackpad area 126, while other driving electrodes such as electrode 150 are outside the virtual trackpad area. Similarly, a portion of sensing electrodes such as electrode 152 pass within the virtual trackpad area 126, while other sensing electrodes such as electrode 154 are outside the virtual trackpad area. The electrodes are illustrated as dashed lines to indicate that they are disposed beneath the display surface.

In this example, a user may compose an email by selecting keys of the virtual keyboard 140 with his fingers and/or thumbs. When the user selects keys of the virtual keyboard 140, non-trackpad touch input signals corresponding to locations outside the virtual trackpad area 126 are received. Because these non-trackpad touch input signals are received from outside the virtual trackpad area 126, these signals are processed with one or more touch detection algorithms 220 applying non-trackpad threshold values. For example, a tap detection algorithm 235 can utilize a non-trackpad threshold value 240 in the form of a minimal tap length (time period) to detect user-intended taps or selections and correspondingly distinguish other unintended screen touches. In one example, the non-trackpad time period for a minimal tap length is 20 milliseconds (ms) for touch input signals received from outside the virtual trackpad area 126. In other examples, other suitable time periods can be used.

By contrast and in one potential advantage of the present disclosure, to provide a user experience more closely aligned with a physical trackpad interaction, for virtual trackpad touch input signals received within the virtual trackpad area 126 the same tap detection algorithm 235 utilizes a different, virtual trackpad threshold value 242 in the form of a minimal tap length time period that is longer than the non-trackpad time period. For example, and with reference again to FIG. 7, a user may touch and move his finger 160 within the virtual trackpad area 126 to position cursor 130 at the send icon 164 in the first touch screen display 124A. The user may then tap his finger 160 within the virtual trackpad area 126 to select the send icon 164 and send the email.

In one example, where the non-trackpad time period for a minimal tap length is 20 ms, the virtual trackpad time period for a minimal tap length is 30 ms. In other examples, other suitable time periods can be used. In this manner, by extending the minimal time period for designating touch inputs within the virtual trackpad area 126 as valid (user-intended) touch selections, the present disclosure provides a more discriminating evaluation of potential touch selections that more closely matches comparable evaluations of potential touch selections in a physical trackpad.

In another example, a palm detection algorithm 238 processes touch input signals using different threshold values based upon whether the touch input occurs within or outside the virtual trackpad area 126. In many touch screen displays, palm detection algorithms are biased towards classifying certain touch inputs as a user's palm, and configured to reject such inputs as unintended. In one example, each "blob" of touch input signals is classified via a heat map into one of four classes—Finger, Smeared finger, Bunch (multiple peaks blob), or Palm. As frames of touch input signals are received, the track of frames remains in an "Uncertain" mode until a confidence level associated with one of the four classes exceeds a confidence level threshold. For example, the confidence level thresholds may be pre-determined likelihood-ratio (LLR) grades for statistical models corresponding to the four classes.

In some examples, one or more heuristics also may be utilized to reduce false classifications. For example, when an electronic stylus or pen is touching the touch screen display or was detected in a recent time frame, such as the previous 2-3 seconds, the system may enter a "palm awareness mode" in which tracks of uncertain frames of touch inputs are biased more towards classification as a user's palm, and thresholds for classifying touch inputs as one or more fingers are increased to bias away from such classifications. In a palm awareness mode, for example, touch input signals representing small blobs (such as 1-2 junctions) are biased to be more likely classified as a palm. In other examples, angles of a stylus or pen are utilized to designate touch restriction regions in which touch inputs are processed differently as compared to touch inputs outside a touch restriction region.

In a virtual trackpad area, however, certain gestures such as a two-finger tap selection may be more frequently used. The use of palm detection algorithms that are biased towards classifying these touch inputs as a user's palm, and configured to thereby reject these inputs as unintended, can provide dissatisfying user experiences for such inputs in the virtual trackpad area 126. Accordingly and in the present disclosure, touch inputs received from the virtual trackpad area 126 may be processed differently by a palm detection algorithm as compared to touch inputs from outside the virtual trackpad area.

In one example, touch inputs received from outside the virtual trackpad area 126 are processed with a palm detection algorithm 238 that applies a non-trackpad threshold value 240 in the form of a non-trackpad palm designation threshold that biases the algorithm towards classifying touch inputs as a user's palm. By contrast and in one potential advantage of the present disclosure, to provide a user experience more closely aligned with a physical trackpad interaction, for virtual trackpad touch input signals received within the virtual trackpad area 126 the same palm detection algorithm 238 utilizes a different, virtual trackpad threshold value 242 in the form of a virtual trackpad palm designation threshold that reduces biasing towards classifying the virtual trackpad touch input signal as a user's palm as compared to the non-trackpad palm designation threshold. In this manner, certain gestures such as a two-finger tap in the virtual trackpad area 126 are more consistently classified appropriately and as the user intended, thereby providing a user experience more closely aligned with a physical trackpad user experience.

In some examples, when a touch screen display enters a palm awareness mode as described above, a non-trackpad palm designation threshold is utilized by the palm detection algorithm 238 to disable all classifications into a particular class (such as a Bunch class including two-finger taps) and thereby further reduce the likelihood of mis-classifying a user's palm into another input class. In these examples, for virtual trackpad touch input signals received from within the virtual trackpad area 126, the palm detection algorithm 238 applies a virtual trackpad palm designation threshold that reduces biasing towards classifying the virtual trackpad touch input signal as a user's palm, and thereby increases the likelihood of accurately classifying a two-finger tap.

In another example, a jitter restrictor algorithm 244 processes touch input signals using different threshold values based upon whether the touch input occurs within or outside the virtual trackpad area 126. As described in more detail below, by applying a different threshold to touch inputs received in the virtual trackpad area 126, the jitter restrictor algorithm 244 increases touch detection resolution within this area to provide more precise tracking of touch locations that mimics the performance of physical trackpads.

In some examples of touch detection, signals received from electrodes in a touch screen display are reported as touch heatmaps to an operating system (OS). These touch heatmaps are reported to the OS at a touch sensor report rate, such as 100 Hz. The touch heatmaps are then processed by touch detection algorithms as described herein to classify inputs as fingers, palms, etc.

Where a touch input is classified as a valid user input, such as a single finger tap, in some examples a jitter restrictor algorithm may be utilized to further categorize the touch input in either a static state or a dynamic state. For example, the reported/outputted location of a touch input may remain unchanged (in a static state) as long as the sensed locations of the touch input signals remain within a predetermined radius, such as 0.5 mm. The size of the predetermined radius may be selected based on the native jitter of the touch screen display, different noise scenarios to be accommodated, and/or other criteria. In this manner, false/unintended movements are avoided. When a sensed location is determined to be outside the predetermined radius, the state of the touch input is changed to a dynamic state and the input is processed differently, such as by increasing the resolution of reported touch heatmaps.

As noted above, and in one potential advantage of the present disclosure, a jitter restrictor algorithm 244 processes touch input signals using different threshold values based upon whether the touch input occurs within or outside the virtual trackpad area 126. As one example, when touch input signals are received from outside the virtual trackpad area 126, the jitter restrictor algorithm 244 uses a non-trackpad threshold value in the form of a non-trackpad distance, such as a 0.5 mm radius, between reported touch locations. As noted, while the locations of the touch inputs remain within the 0.5 mm radius, the reported/outputted location of the touch input remains in a static/unchanged state. When the sensed location is determined to be outside the 0.5 mm radius, the touch input is changed to a dynamic state and subsequent signals are processed differently, such as by increasing the resolution of reported touch heatmaps.

On the other hand, when touch input signals are received from within the virtual trackpad area 126, the jitter restrictor algorithm uses a different, trackpad threshold value in the form of a virtual trackpad distance between reported touch locations that is smaller than the non-trackpad distance. In one example where the non-trackpad distance is a 0.5 mm radius, the virtual trackpad distance is a 0.25 mm radius between reported touch locations. As with touch input signals received outside the virtual trackpad area 126, while the locations of the touch inputs from within the virtual trackpad area 126 remain within the 0.25 mm radius, the reported/outputted location of the touch input remains in a static/unchanged state. When the sensed location is determined to be outside the 0.25 mm radius, the touch input is changed to a dynamic state and subsequent signals are processed differently, such as by increasing the resolution of reported touch heatmaps.

Accordingly, and in one potential advantage of the present disclosure, by utilizing a smaller virtual trackpad distance for touch inputs received from the virtual trackpad area 126, the jitter restrictor algorithm 244 enables a higher resolution of movements within this area to provide the user with more precise control over pointing, selecting, and other functionalities via the virtual trackpad area. Further, by limiting this higher resolution performance to the virtual trackpad area 126 and using a larger non-trackpad jitter threshold outside this area, the present disclosure reduces the likelihood of degraded performance in noisy environments.

In some examples and to further address performance in noisy environments, when the noise level experienced by the computing device 200 is greater than a noise level threshold, the computing device may revert to utilizing the larger non-trackpad jitter threshold for all touch inputs, whether received within or outside the virtual trackpad area 126. In other words, on condition of determining that the noise level is greater than the noise level threshold, the jitter restrictor algorithm 244 may apply the non-trackpad distance between consecutive reported touch locations in processing the virtual trackpad touch input signals received from within the virtual trackpad area 126. In this manner, the computing device selectively adjusts the resolution of touch detection within the virtual trackpad area 126 based upon the current noise level of its environment. Advantageously, by utilizing the larger non-trackpad jitter threshold for touch inputs within the virtual trackpad area 126 when the noise level exceeds the noise level threshold, the computing device avoids degraded performance issues with the virtual trackpad area in particularly noisy environments.

Additionally, in some examples where the noise level is greater than a noise level threshold, and the jitter restrictor algorithm 244 applies the non-trackpad distance in processing virtual trackpad touch input signals received from within the virtual trackpad area 126, the virtual trackpad touch input signals are also processed with the tap detection algorithm applying a virtual trackpad time period as described above and/or the palm detection algorithm applying a virtual trackpad palm designation threshold as described above. In this manner, performance issues associated with noisy environments can be minimized while also providing greater sensitivity to the virtual trackpad area 126.

As noted above, signals received from electrodes in a touch screen display are reported as touch heatmaps to an operating system (OS). These touch heatmaps are generally reported to the OS at a touch sensor report rate, such as 100 Hz. In some examples, a faster touch sensor report rate may be utilized for virtual trackpad touch input signals received from within the virtual trackpad area 126 as compared to a non-trackpad touch sensor report rate for non-trackpad touch input signals received from outside the virtual trackpad area. In one example where the non-trackpad touch sensor report rate is 100 Hz, a faster trackpad touch sensor report rate of 125 Hz. may be utilized. In this manner and by utilizing a faster report rate, the sensitivity and precision of touch detection within the virtual trackpad area 126 may be increased. In other examples other suitable report rates may be utilized.

Also as noted above, in some examples a higher virtual trackpad excitation voltage is provided to the electrodes of a touch screen display that are within the virtual trackpad area 126. In this manner, the signal-to-noise ratio (SNR) within the virtual trackpad area 126 can be improved as compared to areas outside the virtual trackpad area. In one example, where a non-trackpad excitation voltage of 12 V is provided to electrodes outside the virtual trackpad area, a higher virtual trackpad excitation voltage of 15 V is provided to electrodes that are within the virtual trackpad area. In other examples other suitable voltages may be utilized.

Figure 8A:
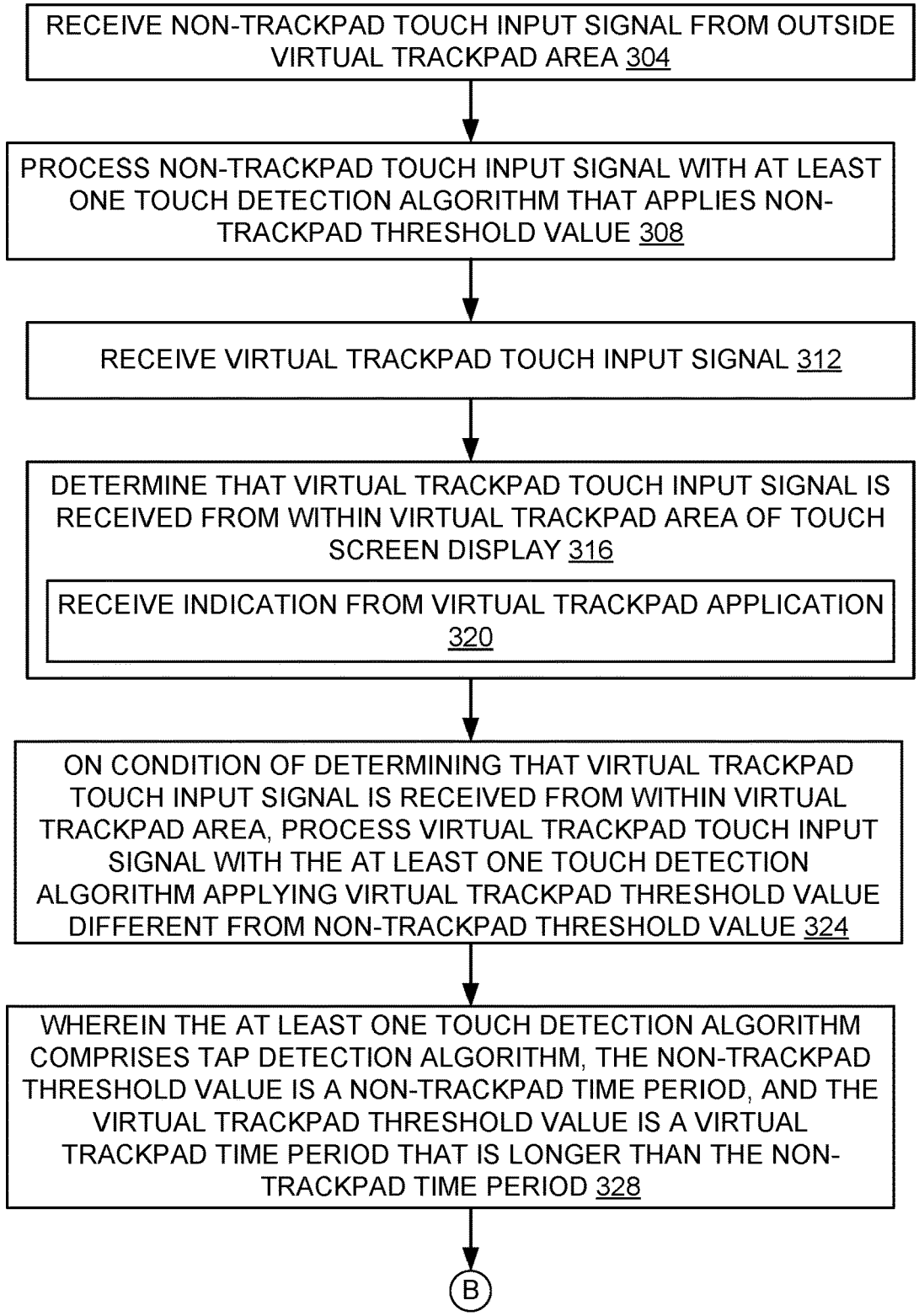
Figure 8C:
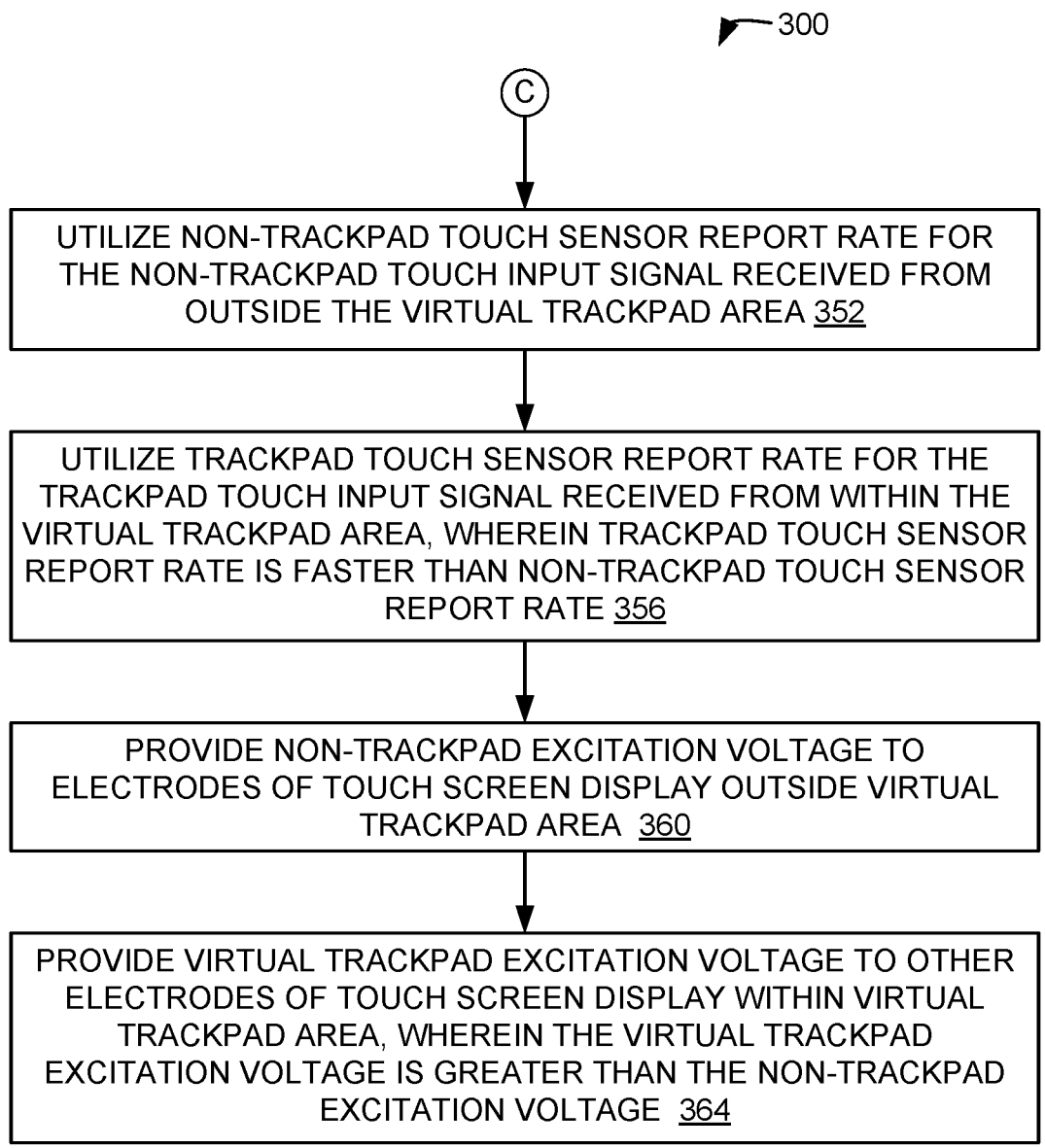

With reference now to FIGS. 8A-8C, a flow diagram is illustrated depicting an example method 300 for performing touch detection within a virtual trackpad area of the touch screen display to provide a physical trackpad user experience. The following description of method 300 is provided with reference to the software and hardware components described herein and shown in FIGS. 1-7 and 9. For example, the method 300 may be performed by computing device 200, hardware, software, and/or firmware of the computing device 200, the large format display 100 or dual screen mobile computing device 120 embodying computing device 200, or a suitable combination of components described herein.

It will be appreciated that the following description of method 300 is provided by way of example and is not meant to be limiting. Therefore, it is to be understood that method 300 may include additional and/or alternative steps relative to those illustrated in FIGS. 8A-8C. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 8A, at 304 the method 300 includes receiving a non-trackpad touch input signal from outside the virtual trackpad area. At 308 the method 300 includes processing the non-trackpad touch input signal with at least one touch detection algorithm that applies a non-trackpad threshold value. At 312 the method 300 includes receiving a virtual trackpad touch input signal. At 316 the method 300 includes determining that the virtual trackpad touch input signal is received from within the virtual trackpad area of the touch screen display. At 320 the method 300 includes, wherein determining that the virtual trackpad touch input signal is received from within the location of the virtual trackpad area comprises receiving an indication from a virtual trackpad application that causes the virtual trackpad area to be displayed on the touch screen display.

At 324 the method 300 includes, on condition of determining that the virtual trackpad touch input signal is received from within the virtual trackpad area, processing the virtual trackpad touch input signal with the at least one touch detection algorithm applying a virtual trackpad threshold value that is different from the non-trackpad threshold value. At 328 the method 300 includes, wherein the at least one touch detection algorithm comprises a tap detection algorithm, the non-trackpad threshold value is a non-trackpad time period, and the virtual trackpad threshold value is a virtual trackpad time period that is longer than the non-trackpad time period.

With reference now to FIG. 8B, at 332 the method 300 includes wherein the at least one touch detection algorithm comprises a palm detection algorithm, the non-trackpad threshold value is a non-trackpad palm designation threshold, and the virtual trackpad threshold value is a virtual trackpad palm designation threshold that reduces biasing towards classifying the virtual trackpad touch input signal as a user's palm as compared to the non-trackpad palm designation threshold. At 336 the method 300 includes wherein the at least one touch detection algorithm comprises a jitter restrictor algorithm, the non-trackpad threshold value is a non-trackpad distance between consecutive reported touch locations, and the virtual trackpad threshold value is a virtual trackpad distance between consecutive reported touch locations that is smaller than the non-trackpad distance between consecutive reported touch locations.

At 340 the method 300 includes determining that a noise level is greater than a noise level threshold. At 344 the method 300 includes, on condition of determining that the noise level is greater than the noise level threshold, processing the virtual trackpad touch input signal with the jitter restrictor algorithm applying the non-trackpad distance between consecutive reported touch locations. At 348 the method 300 includes, after determining that the noise level is greater than the noise level threshold, processing the virtual trackpad touch input signal with at least one of a tap detection algorithm applying a virtual trackpad time period and a palm detection algorithm applying a virtual trackpad palm designation threshold that reduces biasing towards classifying the virtual trackpad touch input signal as a user's palm as compared to a non-trackpad palm designation threshold.

With reference now to FIG. 8C, at 352 the method 300 includes utilizing a non-trackpad touch sensor report rate for the non-trackpad touch input signal received from outside the virtual trackpad area. At 356 the method 300 includes utilizing a trackpad touch sensor report rate for the trackpad touch input signal received from within the virtual trackpad area, wherein the trackpad touch sensor report rate is faster than the non-trackpad touch sensor report rate. At 360 the method 300 includes providing a non-trackpad excitation voltage to electrodes of the touch screen display outside the virtual trackpad area. At 364 providing a virtual trackpad excitation voltage to other electrodes of the touch screen display within the virtual trackpad area, wherein the virtual trackpad excitation voltage is greater than the non-trackpad excitation voltage.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
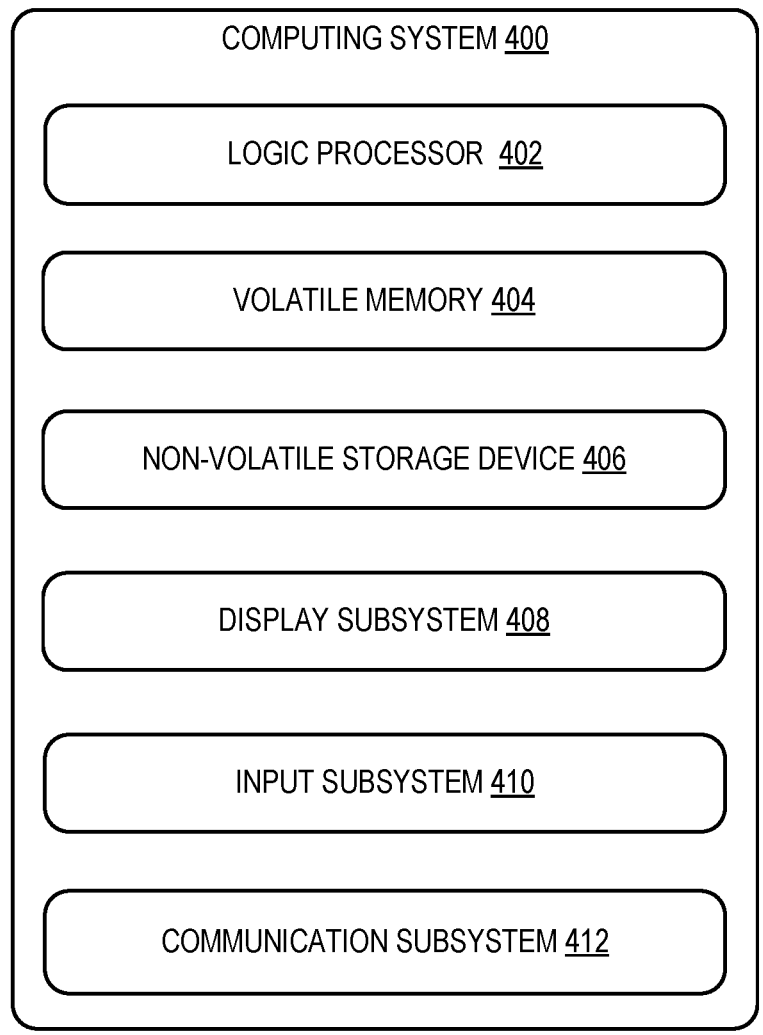
FIG. 9 shows a block diagram of an example computing system according to examples of the present disclosure.

FIG. 9 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, gaming devices, mobile computing devices, mobile communication devices (e.g., smart phone), wearable computing devices, and/or other computing devices. The computing device 200 described above and illustrated in FIG. 6 may comprise computing system 400 or one or more aspects of computing system 400.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, trackpad (virtual or physical), electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides, on a computing device comprising a touch screen display, a method for performing touch detection within a virtual trackpad area of the touch screen display to provide a physical trackpad user experience, the method comprising: receiving a non-trackpad touch input signal from outside the virtual trackpad area; processing the non-trackpad touch input signal with at least one touch detection algorithm that applies a non-trackpad threshold value; receiving a virtual trackpad touch input signal; determining that the virtual trackpad touch input signal is received from within the virtual trackpad area of the touch screen display; and on condition of determining that the virtual trackpad touch input signal is received from within the virtual trackpad area, processing the virtual trackpad touch input signal with the at least one touch detection algorithm applying a virtual trackpad threshold value that is different from the non-trackpad threshold value. The method may additionally or alternatively include, wherein the at least one touch detection algorithm comprises a tap detection algorithm, the non-trackpad threshold value is a non-trackpad time period, and the virtual trackpad threshold value is a virtual trackpad time period that is longer than the non-trackpad time period. The method may additionally or alternatively include, wherein the at least one touch detection algorithm comprises a palm detection algorithm, the non-trackpad threshold value is a non-trackpad palm designation threshold, and the virtual trackpad threshold value is a virtual trackpad palm designation threshold that reduces biasing towards classifying the virtual trackpad touch input signal as a user's palm as compared to the non-trackpad palm designation threshold.

The method may additionally or alternatively include, wherein the at least one touch detection algorithm comprises a jitter restrictor algorithm, the non-trackpad threshold value is a non-trackpad distance between reported touch locations, and the virtual trackpad threshold value is a virtual trackpad distance between reported touch locations that is smaller than the non-trackpad distance between reported touch locations. The method may additionally or alternatively include, determining that a noise level is greater than a noise level threshold; and on condition of determining that the noise level is greater than the noise level threshold, processing the virtual trackpad touch input signal with the jitter restrictor algorithm applying the non-trackpad distance between reported touch locations. The method may additionally or alternatively include, after determining that the noise level is greater than the noise level threshold, processing the virtual trackpad touch input signal with at least one of a tap detection algorithm applying a virtual trackpad time period and a palm detection algorithm applying a virtual trackpad palm designation threshold that reduces biasing towards classifying the virtual trackpad touch input signal as a user's palm as compared to a non-trackpad palm designation threshold.

The method may additionally or alternatively include, utilizing a non-trackpad touch sensor report rate for the non-trackpad touch input signal received from outside the virtual trackpad area; and utilizing a trackpad touch sensor report rate for the trackpad touch input signal received from within the virtual trackpad area, wherein the trackpad touch sensor report rate is faster than the non-trackpad touch sensor report rate. The method may additionally or alternatively include, wherein determining that the virtual trackpad touch input signal is received from within the virtual trackpad area comprises receiving an indication from a virtual trackpad application. The method may additionally or alternatively include, providing a non-trackpad excitation voltage to electrodes of the touch screen display outside the virtual trackpad area; and providing a virtual trackpad excitation voltage to other electrodes of the touch screen display within the virtual trackpad area, wherein the virtual trackpad excitation voltage is greater than the non-trackpad excitation voltage.

Another aspect provides a computing device, comprising a touch screen display that displays a virtual trackpad area; a processor; and a memory storing instructions executable by the processor to provide a physical trackpad user experience via the virtual trackpad area, the instructions executable to: receive a non-trackpad touch input signal from outside the virtual trackpad area; process the non-trackpad touch input signal with at least one touch detection algorithm that applies a non-trackpad threshold value; receive a virtual trackpad touch input signal; determine that the virtual trackpad touch input signal is received from within the virtual trackpad area of the touch screen display; and on condition of determining that the virtual trackpad touch input signal is received from within the virtual trackpad area, process the virtual trackpad touch input signal with the at least one touch detection algorithm applying a virtual trackpad threshold value that is different from the non-trackpad threshold value. The computing device may additionally or alternatively include, wherein the at least one touch detection algorithm comprises a tap detection algorithm, the non-trackpad threshold value is a non-trackpad time period, and the virtual trackpad threshold value is a virtual trackpad time period that is longer than the non-trackpad time period. The computing device may additionally or alternatively include, wherein the at least one touch detection algorithm comprises a palm detection algorithm, the non-trackpad threshold value is a non-trackpad palm designation threshold, and the virtual trackpad threshold value is a virtual trackpad palm designation threshold that reduces biasing towards classifying the virtual trackpad touch input signal as a user's palm as compared to the non-trackpad palm designation threshold.

The computing device may additionally or alternatively include, wherein the at least one touch detection algorithm comprises a jitter restrictor algorithm, the non-trackpad threshold value is a non-trackpad distance between reported touch locations, and the virtual trackpad threshold value is a virtual trackpad distance between reported touch locations that is smaller than the non-trackpad distance between reported touch locations. The computing device may additionally or alternatively include, determining that a noise level is greater than a noise level threshold; and on condition of determining that the noise level is greater than the noise level threshold, processing the virtual trackpad touch input signal with the jitter restrictor algorithm applying the non-trackpad distance between reported touch locations. The computing device may additionally or alternatively include, after determining that the noise level is greater than the noise level threshold, processing the virtual trackpad touch input signal with at least one of a tap detection algorithm applying a virtual trackpad time period and a palm detection algorithm applying a virtual trackpad palm designation threshold that reduces biasing towards classifying the virtual trackpad touch input signal as a user's palm as compared to a non-trackpad palm designation threshold.

The computing device may additionally or alternatively include, wherein the instructions are executable to: utilize a non-trackpad touch sensor report rate for the non-trackpad touch input signal received from outside the virtual trackpad area; and utilize a trackpad touch sensor report rate for the trackpad touch input signal received from within the virtual trackpad area, wherein the trackpad touch sensor report rate is faster than the non-trackpad touch sensor report rate. The computing device may additionally or alternatively include, wherein determining that the virtual trackpad touch input signal is received from within the virtual trackpad area comprises receiving an indication from a virtual trackpad application. The computing device may additionally or alternatively include, wherein the instructions are executable to: provide a non-trackpad excitation voltage to electrodes of the touch screen display outside the virtual trackpad area; and provide a virtual trackpad excitation voltage to other electrodes of the touch screen display within the virtual trackpad area, wherein the virtual trackpad excitation voltage is greater than the non-trackpad excitation voltage.

Another aspect provides a computing device, comprising: a first touch screen that displays a virtual trackpad area; a second touch screen display rotatably coupled to the first touch screen display; a processor; and a memory storing instructions executable by the processor to provide a physical trackpad user experience via the virtual trackpad area, the instructions executable to: receive a non-trackpad touch input signal from outside the virtual trackpad area displayed by the first touch screen display; process the non-trackpad touch input signal with at least one touch detection algorithm that applies a non-trackpad threshold value; receive a virtual trackpad touch input signal; determine that the virtual trackpad touch input signal is received from within the virtual trackpad area displayed by the first touch screen display; and on condition of determining that the virtual trackpad touch input signal is received from within the virtual trackpad area, process the virtual trackpad touch input signal with the at least one touch detection algorithm applying a virtual trackpad threshold value that is different from the non-trackpad threshold value. The computing device may additionally or alternative include, wherein the at least one touch detection algorithm is a tap detection algorithm, a palm detection algorithm, or a jitter restrictor algorithm.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device comprising a touch screen display, a method for performing touch detection within a virtual trackpad area of the touch screen display to provide a physical trackpad user experience, the method comprising:
receiving a non-trackpad touch input signal from outside the virtual trackpad area;
processing the non-trackpad touch input signal with at least a palm detection algorithm that applies a non-trackpad palm designation threshold;
receiving a virtual trackpad touch input signal;
determining that the virtual trackpad touch input signal is received from within the virtual trackpad area of the touch screen display; and
on condition of determining that the virtual trackpad touch input signal is received from within the virtual trackpad area, processing the virtual trackpad touch input signal with the palm detection algorithm applying a virtual trackpad palm designation threshold that is different from the non-trackpad palm designation threshold.

2. The method of claim 1, further comprising:
processing the non-trackpad touch input signal with a tap detection algorithm that applies a non-trackpad time period; and
processing the virtual trackpad touch input signal with a virtual trackpad time period that is longer than the non-trackpad time period.

3. The method of claim 1, wherein the virtual trackpad palm designation threshold reduces biasing towards classifying the virtual trackpad touch input signal as a user's palm as compared to the non-trackpad palm designation threshold.

4. The method of claim 1, further comprising:
processing the non-trackpad touch input signal with a jitter restrictor algorithm that applies a non-trackpad distance between reported touch locations; and
processing the virtual trackpad touch input signal with a virtual trackpad distance between reported touch locations that is smaller than the non-trackpad distance between reported touch locations.

5. The method of claim 4, further comprising:
determining that a noise level is greater than a noise level threshold; and
on condition of determining that the noise level is greater than the noise level threshold, processing the virtual trackpad touch input signal with the jitter restrictor algorithm applying the non-trackpad distance between reported touch locations.

6. The method of claim 5, further comprising, after determining that the noise level is greater than the noise level threshold, processing the virtual trackpad touch input signal with at least one of a tap detection algorithm applying a virtual trackpad time period and the palm detection algorithm.

7. The method of claim 1, further comprising:
utilizing a non-trackpad touch sensor report rate for the non-trackpad touch input signal received from outside the virtual trackpad area; and
utilizing a trackpad touch sensor report rate for the virtual trackpad touch input signal received from within the virtual trackpad area, wherein the trackpad touch sensor report rate is faster than the non-trackpad touch sensor report rate.

8. The method of claim 1, wherein determining that the virtual trackpad touch input signal is received from within the virtual trackpad area comprises receiving an indication from a virtual trackpad application.

9. The method of claim 1, further comprising:
providing a non-trackpad excitation voltage to electrodes of the touch screen display outside the virtual trackpad area; and
providing a virtual trackpad excitation voltage to other electrodes of the touch screen display within the virtual trackpad area, wherein the virtual trackpad excitation voltage is greater than the non-trackpad excitation voltage.

10. A computing device, comprising:
a touch screen display that displays a virtual trackpad area;
a processor; and
a memory storing instructions executable by the processor to provide a physical trackpad user experience via the virtual trackpad area, the instructions executable to:
receive a non-trackpad touch input signal from outside the virtual trackpad area;
process the non-trackpad touch input signal with at least a palm detection algorithm that applies a non-trackpad palm designation threshold;
receive a virtual trackpad touch input signal;
determine that the virtual trackpad touch input signal is received from within the virtual trackpad area of the touch screen display; and
on condition of determining that the virtual trackpad touch input signal is received from within the virtual trackpad area, process the virtual trackpad touch input signal with the palm detection algorithm applying a virtual trackpad palm designation threshold that is different from the non-trackpad palm designation threshold.

11. The computing device of claim 10, wherein the instructions are further executable to:
process the non-trackpad touch input signal with a tap detection algorithm that applies a non-trackpad time period; and
process the virtual trackpad touch input signal with a virtual trackpad time period that is longer than the non-trackpad time period.

12. The computing device of claim 10, wherein the virtual trackpad palm designation threshold reduces biasing towards classifying the virtual trackpad touch input signal as a user's palm as compared to the non-trackpad palm designation threshold.

13. The computing device of claim 10, wherein the instructions are further executable to:
process the non-trackpad touch input signal with a jitter restrictor algorithm that applies a non-trackpad distance between reported touch locations; and process the virtual trackpad touch input signal with a virtual trackpad distance between reported touch locations that is smaller than the non-trackpad distance between reported touch locations.

14. The computing device of claim 13, further comprising:
   determining that a noise level is greater than a noise level threshold; and
   on condition of determining that the noise level is greater than the noise level threshold, processing the virtual trackpad touch input signal with the jitter restrictor algorithm applying the non-trackpad distance between reported touch locations.

15. The computing device of claim 14, further comprising, after determining that the noise level is greater than the noise level threshold, processing the virtual trackpad touch input signal with at least one of a tap detection algorithm applying a virtual trackpad time period and the palm detection algorithm.

16. The computing device of claim 10, wherein the instructions are executable to:
   utilize a non-trackpad touch sensor report rate for the non-trackpad touch input signal received from outside the virtual trackpad area; and
   utilize a trackpad touch sensor report rate for the trackpad touch input signal received from within the virtual trackpad area, wherein the trackpad touch sensor report rate is faster than the non-trackpad touch sensor report rate.

17. The computing device of claim 10, wherein determining that the virtual trackpad touch input signal is received from within the virtual trackpad area comprises receiving an indication from a virtual trackpad application.

18. The computing device of claim 10, wherein the instructions are executable to:
   provide a non-trackpad excitation voltage to electrodes of the touch screen display outside the virtual trackpad area; and
   provide a virtual trackpad excitation voltage to other electrodes of the touch screen display within the virtual trackpad area, wherein the virtual trackpad excitation voltage is greater than the non-trackpad excitation voltage.

19. A computing device, comprising:
   a first touch screen display that displays a virtual trackpad area;
   a second touch screen display rotatably coupled to the first touch screen display;
   a processor; and
   a memory storing instructions executable by the processor to provide a physical trackpad user experience via the virtual trackpad area, the instructions executable to:
      receive a non-trackpad touch input signal from outside the virtual trackpad area displayed by the first touch screen display;
      process the non-trackpad touch input signal with at least a palm detection algorithm that applies a non-trackpad palm designation threshold;
      receive a virtual trackpad touch input signal;
      determine that the virtual trackpad touch input signal is received from within the virtual trackpad area displayed by the first touch screen display; and
      on condition of determining that the virtual trackpad touch input signal is received from within the virtual trackpad area, process the virtual trackpad touch input signal with the palm detection algorithm applying a virtual trackpad palm designation threshold that is different from the non-trackpad palm designation threshold.

20. The computing device of claim 19, wherein the virtual trackpad palm designation threshold reduces biasing towards classifying the virtual trackpad touch input signal as a user's palm as compared to the non-trackpad palm designation threshold.

* * * * *